US012759563B2

(12) United States Patent
Woo et al.

(10) Patent No.: US 12,759,563 B2
(45) Date of Patent: Oct. 13, 2026

(54) VEHICLE SYSTEMS AND RELATED CALIBRATION METHODS

(71) Applicant: GM GLOBAL TECHNOLOGY OPERATIONS LLC, Detroit, MI (US)

(72) Inventors: Ami Woo, Calgary (CA); Mohammadali Shahriari, Markham (CA); Hassan Askari, Thornhill (CA); Dhaval Kavindra Sompura, Canton, MI (US); Kevin A. O'Dea, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 19/008,017

(22) Filed: Jan. 2, 2025

(65) Prior Publication Data

US 2026/0184318 A1 Jul. 2, 2026

(51) Int. Cl.

*B60W 30/18* (2012.01)
*B60W 40/105* (2012.01)
*B60W 50/00* (2006.01)

(52) U.S. Cl.

CPC .... *B60W 40/105* (2013.01); *B60W 30/18009* (2013.01); *B60W 50/00* (2013.01); *B60W 2050/0022* (2013.01); *B60W 2520/10* (2013.01)

(58) Field of Classification Search

CPC ......... B60W 40/105; B60W 30/18009; B60W 50/00; B60W 2050/0022; B60W 2520/10
USPC ............ 701/93
See application file for complete search history.

(56) References Cited

U.S. PATENT DOCUMENTS

| | | | | |
|---|---|---|---|---|
| 2007/0067087 | A1* | 3/2007 | Ohshima | B60K 31/047 701/93 |
| 2023/0415777 | A1* | 12/2023 | Liu | B60W 60/0015 |
| 2024/0132152 | A1* | 4/2024 | Fu | B60W 30/02 |
| 2025/0381853 | A1* | 12/2025 | Matsuno | B60L 15/20 |

FOREIGN PATENT DOCUMENTS

| | | | |
|---|---|---|---|
| CN | 118618380 | A | 9/2020 |
| DE | 10150421 | A1 | 4/2003 |
| DE | 102008032506 | A1 | 1/2009 |
| DE | 102020100522 | A1 | 8/2020 |

* cited by examiner

*Primary Examiner* — Hossam M Abd El Latif
(74) *Attorney, Agent, or Firm* — Ingrassia Fisher & Lorenz, LLP | IFL

(57) ABSTRACT

Vehicles and related systems and methods are provided for dynamic and adaptive coefficient estimation. One method involves detecting a steady state condition and dynamically determining an axle torque reference value and an associated a vehicle speed reference value based on measurement data during the steady state condition. After the steady state condition, the method determines an updated axle torque reference value using the axle torque reference value and a stored axle torque reference value, determines an updated vehicle speed reference value using the vehicle speed reference value and a stored vehicle speed reference value, determines estimated values for one or more nominal axle torque coefficients based at least on a relationship between the updated axle torque reference value and the updated vehicle speed reference value, and determines a torque command for operating the vehicle using the estimated nominal axle torque coefficient values.

20 Claims, 6 Drawing Sheets

500

502

| n | v | τ |
|---|---|---|
| n1 | 11.1 | 155.3 |
| n2 | 17.8 | 240.3 |
| n3 | 20.1 | 276.2 |
| n4 | 22.4 | 285.9 |
| n5 | 32.1 | 408.6 |
| n6 | 33.5 | 415.7 |

FIG. 5

600

602

| n | v | τ |
|---|---|---|
| n1 | 11.1 | 155.3 |
| n2 | 17.8 | 240.3 |
| n3 | 20.1 | 276.2 |
| n4 | 22.2 | 273.9 |
| n5 | 32.1 | 408.6 |
| n6 | 33.5 | 415.7 |

FIG. 6

700

| $n$ | $v$ | $r$ |
|---|---|---|
| 2000 | 11.1 | 155.3 |
| 1000 | 17.8 | 240.3 |
| 500 | 22.2 | 279.3 |
| 300 | 20.1 | 276.2 |
| 200 | 33.5 | 415.7 |
| 100 | 32.1 | 408.6 |

602

FIG. 7

VEHICLE SYSTEMS AND RELATED CALIBRATION METHODS

INTRODUCTION

The technical field generally relates to vehicle systems and more particularly relates to autonomous driver assistance for longitudinal operation of a vehicle within a desired lane of travel.

Modern vehicles include various enhanced or advanced features to support a human driver operating a vehicle. Many vehicles are capable of sensing their environment and facilitating vehicle operation. For example, an autonomous vehicle or other vehicle capable of supporting autonomous operating modes senses its environment using sensing devices such as radar, lidar, image sensors, and the like. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Automated driver assistance technologies hold the potential to improve safety and user experience. Performance of some automated driver assistance technologies can be influenced by initial calibration, however, due to the sheer number of different variables in a real-world environment, it is challenging to calibrate systems in a manner that maintains the desired performance over the lifetime of the vehicle or system. Accordingly, it is desirable to provide driver assistance functionality with adaptive calibration for improved performance over a longer period of time.

SUMMARY

Apparatus for a vehicle and related methods and vehicle systems are provided. One method of operating a vehicle involves detecting, by a controller associated with the vehicle, a steady state condition based at least in part on measurement data from one or more sensors associated with the vehicle during operation of the vehicle, during the steady state condition: dynamically determining, by the controller, an axle torque reference value based at least in part on axle torque measurement data during the steady state condition and dynamically determining, by the controller, a vehicle speed reference value based at least in part on speed measurement data during the steady state condition, and after the steady state condition: determining, by the controller, an updated axle torque reference value based at least in part on the axle torque reference value and a stored axle torque reference value from a preceding steady state condition, determining, by the controller, an updated vehicle speed reference value based at least in part on the vehicle speed reference value and a stored vehicle speed reference value from the preceding steady state condition, determining, by the controller, estimated values for one or more nominal axle torque coefficients based at least on a relationship between the updated axle torque reference value and the updated vehicle speed reference value, determining, by the controller, a torque command for operating the vehicle based at least in part on a targeted speed for the vehicle using the estimated values for the one or more nominal axle torque coefficients, and operating, by the controller, one or more actuators onboard the vehicle in accordance with the torque command.

In one aspect, determining the estimated values involves recursively estimating the one or more nominal axle torque coefficients based at least on the relationship between the updated axle torque reference value and the updated vehicle speed reference value and one or more additional pairs of respective axle torque reference values and respective speed reference values. In one implementation, recursively estimating the one or more nominal axle torque coefficients involves initializing a Kalman filter with a respective pair of a respective axle torque reference value and a respective speed reference value having a greatest number of samples associated therewith.

In one aspect, dynamically determining the axle torque reference value involves calculating the axle torque reference value as a moving average of the axle torque measurement data during the steady state condition and dynamically determining the vehicle speed reference value involves calculating the vehicle speed reference value as a moving average of the speed measurement data during the steady state condition. In one implementation, determining the updated axle torque reference value involves calculating the updated axle torque reference value as a weighted average of the moving average of the axle torque measurement data during the steady state condition and the stored axle torque reference value corresponding to a second moving average of the axle torque measurement data during the preceding steady state condition, and determining the updated vehicle speed reference value involves calculating the updated vehicle speed reference value as a weighted average of the moving average of the speed measurement data during the steady state condition and the stored vehicle speed reference value corresponding to a second moving average of the speed measurement data during the preceding steady state condition.

In one aspect, the method identifies the stored vehicle speed reference value closest to the vehicle speed reference value in a stored array of vehicle speed and axle torque reference value pairs prior to updating the stored array, wherein updating the stored array involves updating an entry in the stored array to include the updated vehicle speed reference value in place of the stored vehicle speed reference value and the updated axle torque reference value in place of the stored axle torque reference value associated with the stored vehicle speed reference value.

In one aspect, the method verifies the estimated values for the one or more nominal axle torque coefficients satisfy one or more validation criteria prior to determining the torque command.

In another aspect, determining the updated vehicle speed reference value involves calculating the updated vehicle speed reference value in accordance with the equation $$v_{store_i} = \frac{n_{store_i}}{n_{store_i} + n_k} v_{store_i} + \frac{n_k}{n_{store_i} + n_k} v_k,$$

where $v_{store_i}$ represents the stored vehicle speed reference value from the preceding steady state condition, $n_{store_i}$ represents a first number of samples associated with the stored vehicle speed reference value, $v_k$ represents the vehicle speed reference value for the steady state condition, and $n_k$ represents a second number of samples associated with the vehicle speed reference value for the steady state condition. In one aspect, determining the updated axle torque reference value involves calculating the updated axle torque reference value in accordance with the equation $$\tau_{store_i} = \frac{n_{store_i}}{n_{store_i} + n_k}\tau_{store_i} + \frac{n_k}{n_{store_i} + n_k}\tau_k,$$

where $\tau_{store_i}$ represents the stored axle torque reference value associated with the stored vehicle speed reference value and Tk represents the axle torque reference value for the steady state condition.

An apparatus is also provided for a non-transitory computer-readable medium comprising executable instructions that, when executed by a processor, cause the processor to provide a control system configurable to detect a steady state condition based at least in part on measurement data from one or more sensors associated with a vehicle during operation of the vehicle, during the steady state condition: dynamically determine an axle torque reference value based at least in part on axle torque measurement data during the steady state condition and dynamically determine a vehicle speed reference value based at least in part on speed measurement data during the steady state condition, and after the steady state condition: determine an updated axle torque reference value based at least in part on the axle torque reference value and a stored axle torque reference value from a preceding steady state condition, determine an updated vehicle speed reference value based at least in part on the vehicle speed reference value and a stored vehicle speed reference value from the preceding steady state condition, determine estimated values for one or more nominal axle torque coefficients based at least on a relationship between the updated axle torque reference value and the updated vehicle speed reference value, determine a torque command for operating the vehicle based at least in part on a targeted speed for the vehicle using the estimated values for the one or more nominal axle torque coefficients, and operate one or more actuators onboard the vehicle in accordance with the torque command.

In one aspect, the control system is configurable to recursively estimate the one or more nominal axle torque coefficients based at least on the relationship between the updated axle torque reference value and the updated vehicle speed reference value and one or more additional pairs of respective axle torque reference values and respective speed reference values. In one implementation, the control system is configurable to initialize a Kalman filter with a respective pair of a respective axle torque reference value and a respective speed reference value having a greatest number of samples associated therewith.

In another aspect, the control system is configurable to calculate the axle torque reference value as a moving average of the axle torque measurement data during the steady state condition and calculate the vehicle speed reference value as a moving average of the speed measurement data during the steady state condition. In one implementation, the control system is configurable to calculate the updated axle torque reference value as a weighted average of the moving average of the axle torque measurement data during the steady state condition and the stored axle torque reference value corresponding to a second moving average of the axle torque measurement data during the preceding steady state condition and calculate the updated vehicle speed reference value as a weighted average of the moving average of the speed measurement data during the steady state condition and the stored vehicle speed reference value corresponding to a second moving average of the speed measurement data during the preceding steady state condition.

In another aspect, the control system is configurable to identify the stored vehicle speed reference value closest to the vehicle speed reference value in a stored array of vehicle speed and axle torque reference value pairs prior to updating the stored array, wherein updating the stored array involves updating an entry in the stored array to include the updated vehicle speed reference value in place of the stored vehicle speed reference value and the updated axle torque reference value in place of the stored axle torque reference value associated with the stored vehicle speed reference value.

In another aspect, the control system is configurable to verify the estimated values for the one or more nominal axle torque coefficients satisfy one or more validation criteria prior to determining the torque command.

In one aspect, the updated vehicle speed reference value is governed by the equation $$v_{store_i} = \frac{n_{store_i}}{n_{store_i} + n_k}v_{store_i} + \frac{n_k}{n_{store_i} + n_k}v_k,$$

where $v_{store_i}$ represents the stored vehicle speed reference value from the preceding steady state condition, $n_{store_i}$ represents a first number of samples associated with the stored vehicle speed reference value, $v_k$ represents the vehicle speed reference value for the steady state condition, and $n_k$ represents a second number of samples associated with the vehicle speed reference value for the steady state condition. In one implementation, the updated axle torque reference value is governed by the equation $$\tau_{store_i} = \frac{n_{store_i}}{n_{store_i} + n_k}\tau_{store_i} + \frac{n_k}{n_{store_i} + n_k}\tau_k,$$

where $\tau_{store_i}$ represents the stored axle torque reference value associated with the stored vehicle speed reference value and Tk represents the axle torque reference value for the steady state condition.

An apparatus is also provided for a vehicle that includes a propulsion system, one or more sensor systems to obtain measurement data including axle torque measurement data and speed measurement data, and a controller coupled to the propulsion system and the one or more sensor systems that, by a processor, is configurable to: detect a steady state condition based at least in part on the measurement data, during the steady state condition: dynamically determine an axle torque reference value based at least in part on the axle torque measurement data during the steady state condition and dynamically determine a vehicle speed reference value based at least in part on the speed measurement data during the steady state condition, and after the steady state condition: determine an updated axle torque reference value based at least in part on the axle torque reference value and a stored axle torque reference value from a preceding steady state condition, determine an updated vehicle speed reference value based at least in part on the vehicle speed reference value and a stored vehicle speed reference value from the preceding steady state condition, determine estimated values for one or more nominal axle torque coefficients based at least on a relationship between the updated axle torque reference value and the updated vehicle speed reference value, determine a torque command for operating the vehicle based at least in part on a targeted speed for the vehicle using the estimated values for the one or more nominal axle torque coefficients, and operate the propulsion system in accordance with the torque command. In one implementation, the controller is configurable to determine the estimated values by recursively estimating the one or more nominal axle torque coefficients based at least on the relationship between the updated axle torque reference value and the updated vehicle speed reference value and one or more additional pairs of respective axle torque reference values and respective speed reference values.

BRIEF DESCRIPTION OF THE DRAWINGS

The exemplary aspects will hereinafter be described in conjunction with the following drawing figures, wherein like numerals denote like elements, and wherein:

FIGS. 5-7 depict different states of a stored array of nominal axle torque and vehicle speed reference value pairs suitable for implementation in connection with the coefficient estimation process of FIG. 4 in accordance with one or more example implementations.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
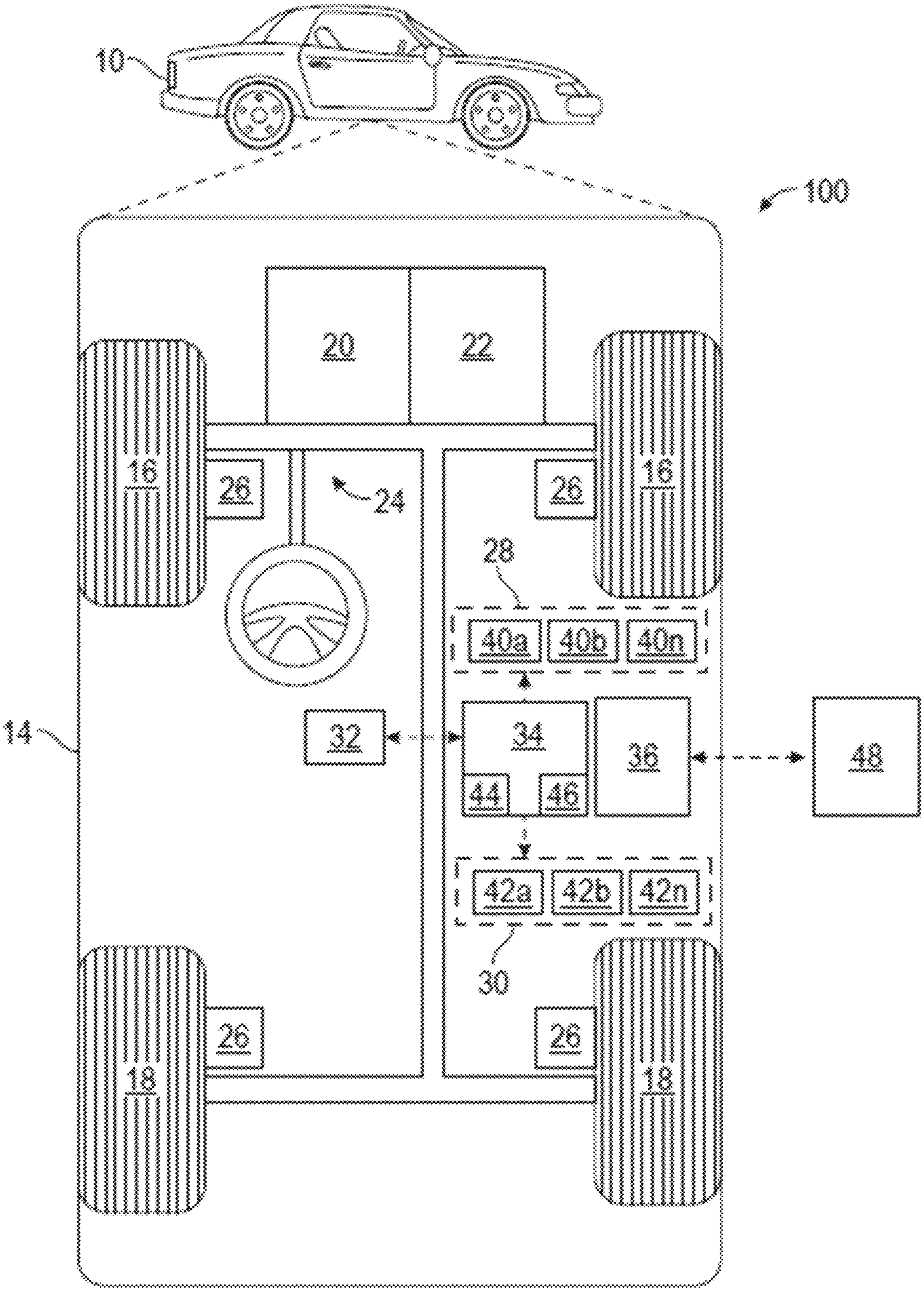
FIG. 1 is a block diagram illustrating a vehicle system in accordance with various implementations.

FIG. 1 depicts an exemplary implementation of a vehicle system 100 suitable for providing one or more driver assistance features or functionality that supports autonomous operation of a vehicle 10. In this regard, in some implementations, the vehicle system 100 is capable of determining a plan for autonomously operating a vehicle 10 along a route in a manner that accounts for objects or obstacles detected by onboard sensors 28, 40. As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks. For example, the vehicle system 100 may support an adaptive cruise control (ACC) autonomous operating mode or other driver assistance functionality that autonomously controls steering to facilitate maintaining the vehicle 10 in a desired lane of travel with a desired speed.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, and/or other sensors. The actuator system 30 includes one or more actuator devices 42*a*-42*n* that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10, such as, for example, calibration data. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various implementations, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary implementations, the data storage element 46 maintains information that may be utilized to determine corresponding a lateral reference trajectory for maneuvering laterally, with the resulting reference lateral trajectory being utilized or otherwise referenced by the processor 44 to determine steering commands for autonomously operating the vehicle 10 to mitigate lateral deviations from the desired lane of travel.

Still referring to FIG. 1, in exemplary implementations, the communication system 36 is configured to wirelessly communicate information to and from other entities 48 over a communication network, such as but not limited to, other vehicles ("V2V" communication) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
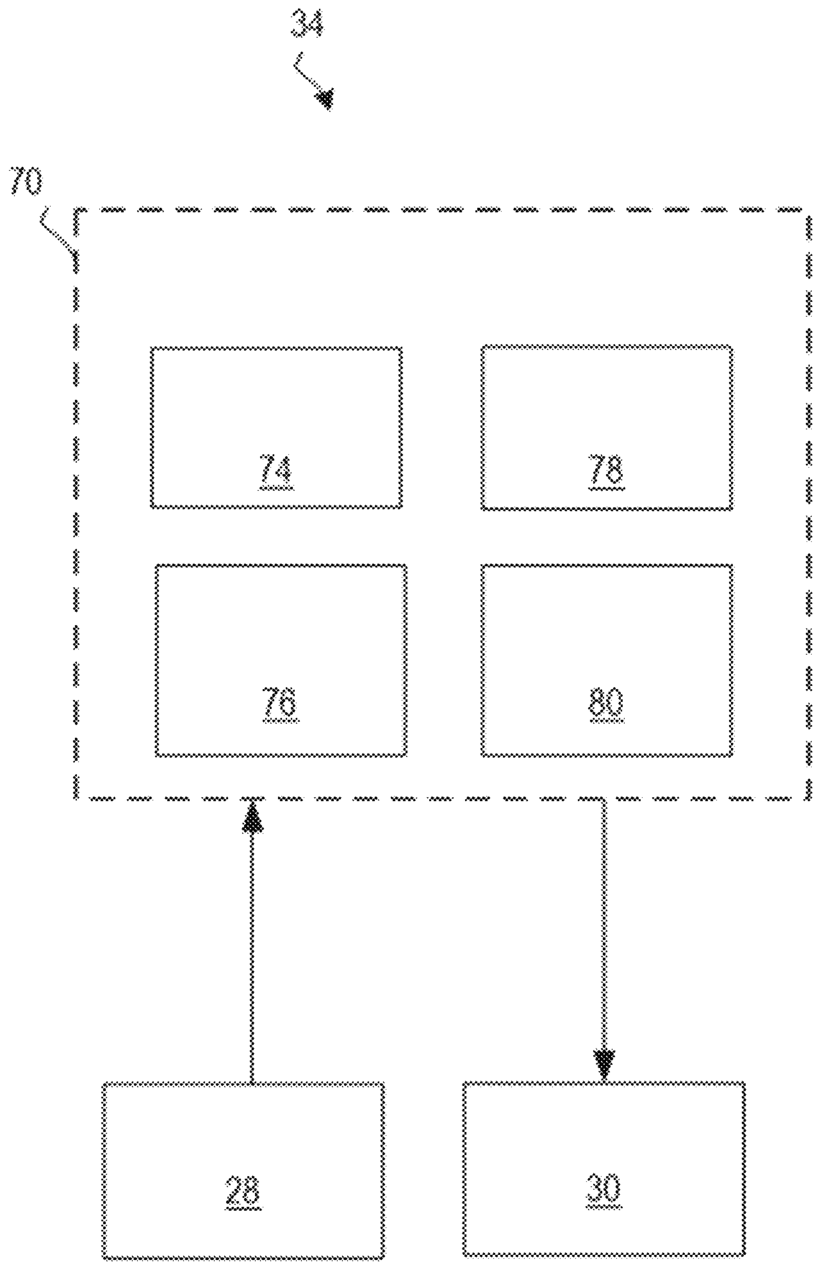
FIG. 2 is a block diagram illustrating an autonomous driving system (ADS) suitable for use with the vehicle system of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and current vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The route information may be obtained from, for example, an onboard data storage element 32, an online database, or other entity. In one or more implementations, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48, 52, 54. In some implementations, the longitudinal vehicle constraint data may be calculated or otherwise determined dynamically or substantially in real-time based on the current mass of the vehicle, the current amount of fuel onboard the vehicle, historical or recent performance of the vehicle, and/or potentially other factors. In one or more implementations, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid obstacles, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48, 52, 54. The lateral solver module may also receive or otherwise obtain user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding obstacles by varying one or more of the vehicle's velocity, acceleration/deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

Figure 3:
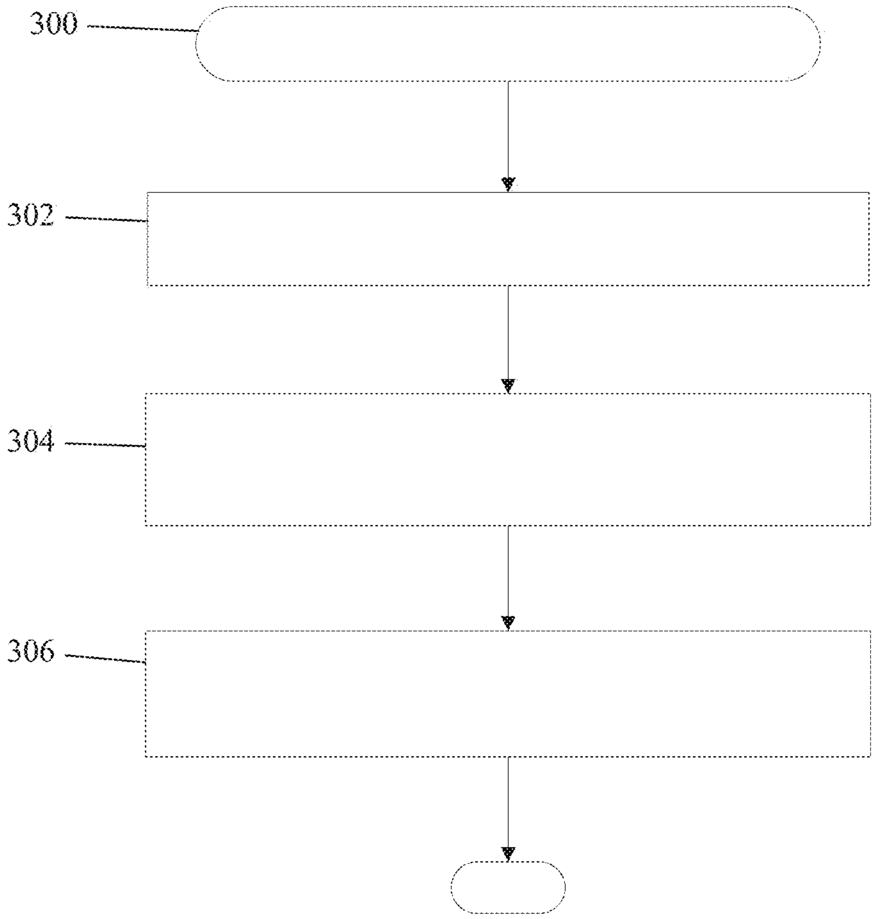
FIG. 3 is a flow diagram illustrating a longitudinal control process suitable for implementation by a vehicle control system in the ADS of FIG. 2 according to one or more implementations described herein.

FIG. 3 depicts an exemplary longitudinal control process 300 suitable for implementation by an ADS, vehicle control system, or other service associated with a control module of a vehicle capable of autonomously controlling operation of a propulsion system or other actuators of a vehicle. For illustrative purposes, the following description may refer to elements mentioned above in connection with FIGS. 1-2. While portions of the longitudinal control process 300 may be performed by different elements of a vehicle system, for purposes of explanation, the subject matter may be primarily described herein in the context of the longitudinal control process 300 being primarily performed by an adaptive cruise control (ACC) service or another similar feature or service implemented at a controller 34 or other control module associated with a control system of a vehicle 10.

Referring now to FIG. 3 with continued reference to FIGS. 1-2, in exemplary implementations, the longitudinal control process 300 initializes or begins by receiving, obtaining or otherwise identifying a targeted speed for the vehicle in a longitudinal direction at 302 when an autonomous operating mode is enabled. For example, when an ACC mode is enabled, an ACC service implemented by or at the controller 34 and/or processor 44 may receive or otherwise identify a targeted longitudinal set speed desired by the driver based on a user input indicative of the longitudinal speed for the vehicle 10 desired by the driver. In other autonomous operating modes, the ADS 70 and/or control system 80 may identify or obtain the targeted longitudinal speed based on a longitudinal travel plan provided by a guidance system 78.

At 304, the longitudinal control process 300 calculates or otherwise determines a nominal torque command for achieving the targeted vehicle speed using one or more nominal axle torque coefficients calibrated for the vehicle. In this regard, a nominal axle torque command can be calculated by multiplying the tire radius by an estimated road load force (F) calculated as a function of the targeted vehicle speed ($v_x$) and road grade ($\theta$) using nominal axle torque coefficients (a, b, c) in accordance with the equation $$F = (a + b \cdot v_x + c \cdot v_x^2) + M \cdot g \cdot \sin\theta,$$

where M represents the mass of the vehicle 10, g is the coefficient of gravity (or gravitational constant), a is a nominal axle torque coefficient corresponding to the effect of rolling resistance, b is a nominal axle torque coefficient corresponding to the dependence of rolling resistance on drivetrain losses and vehicle speed (or velocity), and c is a nominal axle torque coefficient corresponding to aerodynamic drag. As described in greater detail below in the context of FIG. 4, in exemplary implementations described herein, the nominal axle torque coefficients are adaptive and dynamically determined during operation of the vehicle 10.

At 306, the longitudinal control process 300 operates one or more actuators associated with the vehicle in accordance with the nominal torque command. For example, the ADS 70, vehicle control system 80 and/or other software service implemented by the processor 44 may cause the controller 34 to command, signal, instruct or otherwise operate the propulsion system 20 and/or another actuator system 30 to achieve the commanded torque output via the wheels 16, 18 and thereby control or influence the speed of the vehicle 10 to reduce the difference from the targeted vehicle speed using the nominal torque command. Accordingly, by improving the accuracy or reliability of the nominal axle torque coefficients, the resulting performance of an ACC mode or other autonomous operating mode incorporating the longitudinal control process 300 is improved.

Figure 4:
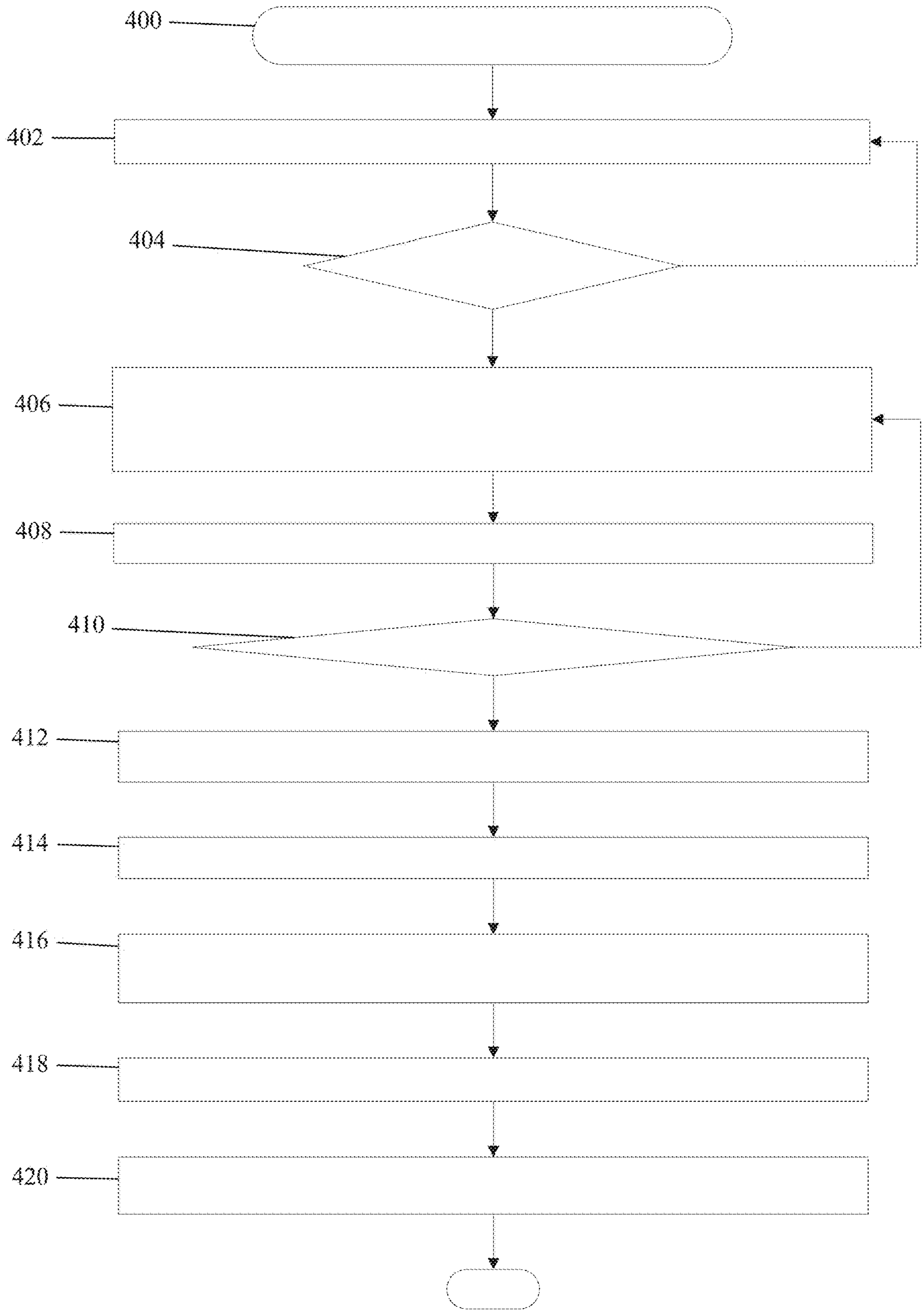
FIG. 4 is a flow diagram illustrating a coefficient estimation process suitable for implementation by a vehicle control system in the ADS of FIG. 2 according to one or more implementations described herein.

FIG. 4 depicts an exemplary coefficient estimation process 400 suitable for implementation by a system or service associated with a control module of a vehicle capable of autonomously controlling operation of a propulsion system or other actuators of a vehicle. For illustrative purposes, the following description may refer to elements mentioned above in connection with FIGS. 1-3. While portions of the coefficient estimation process 400 may be performed by different elements of a vehicle system, for purposes of explanation, the subject matter may be primarily described herein in the context of the coefficient estimation process 400 being primarily performed by a service or software component implemented by a processor 44 of a controller 34 or other control module associated with a control system of a vehicle 10 in connection with the longitudinal control process 300 of FIG. 3.

The coefficient estimation process 400 begins at 402 by receiving or otherwise obtaining measurement data from one or more sensors associated with the vehicle to detect or otherwise identify when the vehicle is in a steady state condition at 404. In this regard, the coefficient estimation process 400 continually monitors or analyzes measurement data from various sensor systems 28 associated with the vehicle 10 to detect when the vehicle 10 has entered or otherwise achieved a steady state condition based on the sensor measurement data. The sensor measurement data analyzed to detect a steady state condition may include, but is not limited to, axle torque measurement data, speed measurement data, acceleration measurement data, brake torque measurement data, steering wheel angle measurement data, inertial measurement data (e.g., roll, pitch or yaw measurement data) and/or the like. In an exemplary implementation, the coefficient estimation process 400 verifies or otherwise confirms that a plurality of different parameters or variables of interest are substantially stable prior to detecting a steady state condition, including, but not limited to, the measured axle torque, the measured brake torque, the wheel speed and/or vehicle speed, the steering wheel angle, the yaw rate, and/or the like. For each parameter of interest, the coefficient estimation process 400 may statistically determine that the respective parameter is stable when the variance of the measured sensor data for the respective parameter over a preceding window of time (or number of samples) is less than a first steady state threshold and the derivative or rate of change of the respective parameter relative to the preceding sample is less than a second steady state threshold. For example, the measured axle torque coefficient may be determined to be at steady state when the variance of the measured axle torque over a preceding number of samples $$n\left(\sqrt{\frac{\sum(\tau_i-\bar{\tau})^2}{n-1}}\right)$$

is less than a steady state variance threshold value and the magnitude of the derivative of successive measured axle torque measurements $$\left(\frac{|\tau_i-\tau_{i-1}|}{dt}\right)$$

is less than a steady state derivative threshold value. In this regard, when each of the parameters of interest that are monitored by the coefficient estimation process 400 are stable, the coefficient estimation process 400 determines that the vehicle is exhibiting a steady state condition.

When the coefficient estimation process 400 detects the start of a steady state condition at 404, the coefficient estimation process 400 continues by adaptively and dynamically determining a respective pair of axle torque and speed reference values to be utilized for recalibrating the nominal axle torque coefficients using an exponential moving average of the recent axle torque and speed measurements at 406. For each sample of torque and speed measurement value pairs used to determine the pair of axle torque and speed reference values, the coefficient estimation process 400 increments a counter tracking the number of samples utilized to determine the axle torque and speed reference value pair at 408 until detecting an end of the steady state condition at 410. In this regard, during the steady state condition, for each instance or iteration of an updated axle torque sensor measurement value and an updated vehicle speed measurement value, the coefficient estimation process 400 dynamically determines an updated reference value for the respective axle torque sensor measurement value or vehicle speed sensor measurement value as an exponential moving average of the preceding reference value and the most recent updated measurement value.

For example, an updated vehicle speed reference value for the current sample (Dk) may be determined in accordance with the equation $v_k=\alpha\cdot v_{k-1}+(1-\alpha)\cdot v_m$, where $v_{k-1}$ represents the previously determined vehicle speed reference value resulting from the preceding sample and $v_m$ represents the current vehicle speed sensor measurement value for the current sample. In a similar manner, an updated axle torque reference value for the current sample ($\tau_k$) may be determined in accordance with the equation $\tau_k=\alpha\cdot\tau_{k-1}+(1-\alpha)\cdot\tau_m$, where $\tau_{k-1}$ represents the previously determined axle torque reference value resulting from the preceding sample and $\tau_m$ represents the current axle torque sensor measurement value for the current sample. To initialize the axle torque and vehicle speed reference values for an initial sample at the start of the steady state condition (e.g., $v_0$ and $\tau_0$), in an exemplary implementation, the coefficient estimation process 400 calculates the initial reference values as an average of one or more preceding measurement values corresponding to the preceding window of time (or number of samples) before detecting the steady state condition.

When the coefficient estimation process 400 detects an absence or end of the steady state condition (e.g., when one of the parameters of interest exhibits a variance or derivative greater than a respective steady state threshold), the coefficient estimation process 400 updates a stored array of respective axle torque and vehicle speed reference value pairs and associated number of samples at 412 using the current axle torque and vehicle speed reference value pairs and associated number of samples for the most recent instance of a steady state condition. In one exemplary implementation, the coefficient estimation process 400 updates a particular location in the stored array having a stored vehicle speed reference value closest to the vehicle speed reference value from the most recent steady state condition by replacing the stored vehicle speed reference value with a weighted average of the previously stored vehicle speed reference value and the current vehicle speed reference value. Additionally, the location in the stored array having a stored axle torque reference value associated with that previously stored vehicle speed reference value is updated by replacing the stored axle torque reference value with a weighted average of the previously stored axle torque reference value and the current axle torque reference value. The respective number of samples associated with the location in the stored array being updated is also updated by adding the current number of samples associated with the most recent instance of a steady state condition (e.g., the value of the counter at 408) to the previously stored number of samples associated with that location in the stored array.

For example, in an exemplary implementation, the location in the stored array having a stored vehicle speed reference value closest to the vehicle speed reference value from the most recent steady state condition is updated with a value governed by the equation $$v_{store_i} = \frac{n_{store_i}}{n_{store_i} + n_k} v_{store_i} + \frac{n_k}{n_{store_i} + n_k} v_k,$$

where $v_{store_i}$ represents the previously stored vehicle speed reference value at that location, $n_{store_i}$ represents the previously stored number of samples associated with that previously stored vehicle speed reference value, $v_k$ represents the most recently determined vehicle speed reference value (e.g., at 406) and $n_k$ represents the number of samples associated with the with the most recent instance of a steady state condition (e.g., the value of the counter at 408). In a similar manner, the location in the stored array having a stored axle torque reference value associated with the updated vehicle speed reference value is updated with a value governed by the equation $$\tau_{store_i} = \frac{n_{store_i}}{n_{store_i} + n_k} \tau_{store_i} + \frac{n_k}{n_{store_i} + n_k} \tau_k,$$

where $\tau_{store_i}$ represents the previously stored axle torque reference value at that location and $\tau_k$ represents the most recently determined axle torque reference value (e.g., at 406). The number of samples associated with the location in the stored array being updated is also updated with a value governed by the equation $n_{store_i} = n_{store_i} + n_k$.

FIGS. 5-6 depict examples of different states of a stored array maintaining respective associations between pairs of vehicle speed reference and axle torque reference values and their associated number of samples in accordance with an exemplary implementation of the coefficient estimation process 400. FIG. 5 depicts an initial state of a stored array 500 of respective axle torque and vehicle speed reference value pairs and associated number of samples prior to updating the stored array 500 at 412, resulting in the updated stored array 600 of FIG. 6. In this regard, FIG. 6 depicts an example implementation where the vehicle speed reference value for the most recent steady state condition is equal to [inventors to provide realistic example] which is closest to the previously stored vehicle speed reference value of [inventors to provide], resulting in the entry 502 in the stored array 500 for that nearest previously stored vehicle speed reference value being updated to reflect the most recent vehicle speed reference value of XX associated with the most recent axle torque reference value of [yyy] with a current number of samples [yyy], resulting in the updated entry 602 at that location in the updated stored array 600.

Referring again to FIG. 4, after updating the stored array of respective axle torque and vehicle speed reference value pairs, exemplary implementations of the coefficient estimation process 400 continues by sorting the stored array in descending order based on the number of samples associated with the respective locations in the stored array at 414 before recursively estimating the nominal axle torque coefficients using the stored axle torque and vehicle speed reference value pairs at 416. In this regard, the nominal axle torque coefficients (â, $\hat{b}$ and ĉ) are recursively estimated using a continuous parametric model using the equation $$\tau_{v_x} = (\hat{a} + \hat{b} \cdot v_x + \hat{c} \cdot v_x^2),$$

where $\tau_{v_x}$ and $v_x$ are a respective pair of axle torque and vehicle speed reference values, in a manner that prioritizes the respective pair of torque and vehicle speed reference values having the highest number of samples associated therewith. For example, the respective stored axle torque and vehicle speed reference value pair having the greatest number of samples associated therewith is utilized to initialize, weight or otherwise bias the recursive estimation such that more weight is given to the respective stored axle torque and vehicle speed reference value pairs associated with the greatest number of samples while still allowing the estimate to adapt to dynamically account for different stored axle torque and vehicle speed reference value pairs associated with a lesser number of samples.

[in one implementation—Kalman filter/implementation details here]—we should incorporate/refer to the example shown in FIG. 6 starting with the highest n entry in the table—we can add a FIG. 7 showing FIG. 6 sorted by n Referring again to FIG. 4, after updating the estimated values for the nominal axle torque coefficients, in exemplary implementations, the coefficient estimation process 400 validates or otherwise verifies the updated values for the nominal axle torque coefficients at 418 prior to enabling use of the updated estimated values to generate torque commands for operating the vehicle at 420. In this regard, the coefficient estimation process 400 may apply a number of different validation criteria, thresholds or other logic to verify the estimated values for the nominal axle torque coefficients are realistic and plausible. For example, the coefficient estimation process 400 may verify that the quadratic coefficient corresponding to aerodynamic drag is greater than zero ($\hat{c}>0$) and that the nominal torque calculated for a particular minimum speed value ($v_{min}$) is greater than a minimum torque threshold ($\hat{a}+\hat{b}v_{min}>\tau_{th}$). Additionally, in one or more implementations, the coefficient estimation process 400 also verifies or otherwise confirms that the stored axle torque reference values increase with respect to the vehicle speed values associated therewith.

In exemplary implementations, the coefficient estimation process 400 also verifies that the error or difference between an estimated torque calculated using the estimated values for the nominal axle torque coefficients and an observed torque is less than a threshold using the stored array of axle torque reference values and corresponding vehicle speed values. In this regard, the error associated with a respective entry in the stored array may be calculated or otherwise determined using the equation $$\in_{v_x} = \sqrt{((\hat{a} + \hat{b} \cdot v_x + \hat{c} \cdot v_x^2) - \tau_{v_x})^2},$$

where $\tau_{v_x}$ and $v_x$ correspond to a respective pair of axle torque and vehicle speed reference values in the stored array. In exemplary implementations, the coefficient estimation process 400 validates the estimated nominal axle torque coefficient values when the cumulative error across the entire array of value pairs is less than a validation threshold (e.g., $\Sigma\in_{v_x}<\in_{th}$).

After validating the updated estimated nominal axle torque coefficient values and the underlying data in the stored array, the coefficient estimation process 400 enables use of the updated estimated nominal axle torque coefficient values by the ADS 70, vehicle control system 80 and/or other software service (e.g., at 304 of the longitudinal control process 300) to generate torque commands for achieving a targeted vehicle speed using estimated values for the nominal axle torque coefficients. Additionally, in various implementations, the estimated nominal axle torque coefficient values may also be utilized to detect or otherwise identify when the vehicle is traveling on a flat road (e.g., when the nominal axle torque calculated for the current vehicle speed using the estimated nominal axle torque coefficient values is within a threshold of the axle torque measured or applied by the driver) for purposes of triggering, initiating or otherwise performing other calibrations during a flat road condition (e.g., estimating sensor biases and the like).

In exemplary implementations, the coefficient estimation process 400 is continually performed during operation of a vehicle to dynamically and adaptively adjust the nominal axle torque coefficients over time, thereby self-learning and accounting for changes associated with the vehicle over time. Accordingly, by improving the accuracy or reliability of the nominal axle torque coefficients, the resulting performance of an ACC mode or other operating modes or features using the nominal axle torque coefficients is improved.

For sake of brevity, conventional techniques related to vehicle controls, driver assistance features, autonomous vehicles, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an implementation of the subject matter.

As used herein, the word "exemplary" means "serving as an example, instance, or illustration." Thus, any implementation described herein as "exemplary" is not necessarily to be construed as preferred or advantageous over other implementations. All of the implementations described herein are exemplary implementations provided to enable persons skilled in the art to make or use the invention and not to limit the scope of the invention which is defined by the claims.

Those of skill in the art will appreciate that the various illustrative logical blocks, modules, circuits, and algorithm steps described in connection with the implementations disclosed herein may be implemented as electronic hardware, computer software, or combinations of both. Some of the implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of operating a vehicle, the method comprising:

detecting, by a controller associated with the vehicle, a steady state condition based at least in part on measurement data from one or more sensors associated with the vehicle during operation of the vehicle;

during the steady state condition:

dynamically determining, by the controller, an axle torque reference value based at least in part on axle torque measurement data during the steady state condition; and dynamically determining, by the controller, a vehicle speed reference value based at least in part on speed measurement data during the steady state condition; and after the steady state condition:

determining, by the controller, an updated axle torque reference value based at least in part on the axle torque reference value and a stored axle torque reference value from a preceding steady state condition;

determining, by the controller, an updated vehicle speed reference value based at least in part on the vehicle speed reference value and a stored vehicle speed reference value from the preceding steady state condition;

determining, by the controller, estimated values for one or more nominal axle torque coefficients based at least on a relationship between the updated axle torque reference value and the updated vehicle speed reference value;

determining, by the controller, a torque command for operating the vehicle based at least in part on a targeted speed for the vehicle using the estimated values for the one or more nominal axle torque coefficients; and operating, by the controller, one or more actuators onboard the vehicle in accordance with the torque command.

2. The method of claim 1, wherein determining the estimated values comprises recursively estimating the one or more nominal axle torque coefficients based at least on the relationship between the updated axle torque reference value and the updated vehicle speed reference value and one or more additional pairs of respective axle torque reference values and respective speed reference values.

3. The method of claim 2, wherein recursively estimating the one or more nominal axle torque coefficients comprises estimating initial nominal axle torque coefficient values based on a respective pair of a respective axle torque reference value and a respective speed reference value having a greatest number of samples associated therewith.

4. The method of claim 1, wherein:

dynamically determining the axle torque reference value comprises calculating the axle torque reference value as a moving average of the axle torque measurement data during the steady state condition; and dynamically determining the vehicle speed reference value comprises calculating the vehicle speed reference value as a moving average of the speed measurement data during the steady state condition.

5. The method of claim 4, wherein:

determining the updated axle torque reference value comprises calculating the updated axle torque reference value as a weighted average of the moving average of the axle torque measurement data during the steady state condition and the stored axle torque reference value comprising a second moving average of the axle torque measurement data during the preceding steady state condition; and determining the updated vehicle speed reference value comprises calculating the updated vehicle speed reference value as a weighted average of the moving average of the speed measurement data during the steady state condition and the stored vehicle speed reference value comprising a second moving average of the speed measurement data during the preceding steady state condition.

6. The method of claim 1, further comprising identifying the stored vehicle speed reference value closest to the vehicle speed reference value in a stored array of vehicle speed and axle torque reference value pairs prior to updating the stored array, wherein updating the stored array comprises updating an entry in the stored array to include the updated vehicle speed reference value in place of the stored vehicle speed reference value and the updated axle torque reference value in place of the stored axle torque reference value associated with the stored vehicle speed reference value.

7. The method of claim 1, further comprising verifying the estimated values for the one or more nominal axle torque coefficients satisfy one or more validation criteria prior to determining the torque command.

8. The method of claim 1, wherein determining the updated vehicle speed reference value comprises calculating the updated vehicle speed reference value in where: accordance with the equation $$v_{store_i} = \frac{n_{store_i}}{n_{store_i} + n_k} v_{store_i} + \frac{n_k}{n_{store_i} + n_k} v_k,$$

where:

$v_{store_i}$ represents the stored vehicle speed reference value from the preceding steady state condition;

$n_{store_i}$ represents a first number of samples associated with the stored vehicle speed reference value;

$v_k$ represents the vehicle speed reference value for the steady state condition; and $n_k$ represents a second number of samples associated with the vehicle speed reference value for the steady state condition.

9. The method of claim 8, wherein determining the updated axle torque reference value comprises calculating the updated axle torque reference value in accordance with the equation $$\tau_{store_i} = \frac{n_{store_i}}{n_{store_i} + n_k}\tau_{store_i} + \frac{n_k}{n_{store_i} + n_k}\tau_k,$$

where:

$\tau_{store_i}$ represents the stored axle torque reference value associated with the stored vehicle speed reference value; and $\tau_k$ represents the axle torque reference value for the steady state condition.

10. A non-transitory computer-readable medium comprising executable instructions that, when executed by a processor, cause the processor to provide a control system configurable to:

detect a steady state condition based at least in part on measurement data from one or more sensors associated with a vehicle during operation of the vehicle;

during the steady state condition:

dynamically determine an axle torque reference value based at least in part on axle torque measurement data during the steady state condition; and dynamically determine a vehicle speed reference value based at least in part on speed measurement data during the steady state condition; and after the steady state condition:

determine an updated axle torque reference value based at least in part on the axle torque reference value and a stored axle torque reference value from a preceding steady state condition;

determine an updated vehicle speed reference value based at least in part on the vehicle speed reference value and a stored vehicle speed reference value from the preceding steady state condition;

determine estimated values for one or more nominal axle torque coefficients based at least on a relationship between the updated axle torque reference value and the updated vehicle speed reference value;

determine a torque command for operating the vehicle based at least in part on a targeted speed for the vehicle using the estimated values for the one or more nominal axle torque coefficients; and operate one or more actuators onboard the vehicle in accordance with the torque command.

11. The non-transitory computer-readable medium of claim 10, wherein the control system is configurable to recursively estimate the one or more nominal axle torque coefficients based at least on the relationship between the updated axle torque reference value and the updated vehicle speed reference value and one or more additional pairs of respective axle torque reference values and respective speed reference values.

12. The non-transitory computer-readable medium of claim 11, wherein the control system is configurable to estimate initial nominal axle torque coefficient values based on a respective pair of a respective axle torque reference value and a respective speed reference value having a greatest number of samples associated therewith.

13. The non-transitory computer-readable medium of claim 10, wherein the control system is configurable to:

calculate the axle torque reference value as a moving average of the axle torque measurement data during the steady state condition; and calculate the vehicle speed reference value as a moving average of the speed measurement data during the steady state condition.

14. The non-transitory computer-readable medium of claim 13, wherein the control system is configurable to:

calculate the updated axle torque reference value as a weighted average of the moving average of the axle torque measurement data during the steady state condition and the stored axle torque reference value comprising a second moving average of the axle torque measurement data during the preceding steady state condition; and calculate the updated vehicle speed reference value as a weighted average of the moving average of the speed measurement data during the steady state condition and the stored vehicle speed reference value comprising a second moving average of the speed measurement data during the preceding steady state condition.

15. The non-transitory computer-readable medium of claim 10, wherein the control system is configurable to identify the stored vehicle speed reference value closest to the vehicle speed reference value in a stored array of vehicle speed and axle torque reference value pairs prior to updating the stored array, wherein updating the stored array comprises updating an entry in the stored array to include the updated vehicle speed reference value in place of the stored vehicle speed reference value and the updated axle torque reference value in place of the stored axle torque reference value associated with the stored vehicle speed reference value.

16. The non-transitory computer-readable medium of claim 10, wherein the control system is configurable to verify the estimated values for the one or more nominal axle torque coefficients satisfy one or more validation criteria prior to determining the torque command.

17. The non-transitory computer-readable medium of claim 10, wherein the updated vehicle speed reference value is governed by the equation $$v_{store_i} = \frac{n_{store_i}}{n_{store_i} + n_k}v_{store_i} + \frac{n_k}{n_{store_i} + n_k}v_k,$$

where:

$v_{store_i}$ represents the stored vehicle speed reference value from the preceding steady state condition;

$n_{store_i}$ represents a first number of samples associated with the stored vehicle speed reference value;

$v_k$ represents the vehicle speed reference value for the steady state condition; and $n_k$ represents a second number of samples associated with the vehicle speed reference value for the steady state condition.

18. The non-transitory computer-readable medium of claim 17, wherein the updated axle torque reference value is governed by the equation $$\tau_{store_i}=\frac{n_{store_i}}{n_{store_i}+n_k}\tau_{store_i}+\frac{n_k}{n_{store_i}+n_k}\tau_k,$$

where:

$\tau_{store_i}$ represents the stored axle torque reference value associated with the stored vehicle speed reference value; and $\tau_k$ represents the axle torque reference value for the steady state condition.

19. A vehicle comprising:

a propulsion system;

one or more sensor systems to obtain measurement data including axle torque measurement data and speed measurement data; and a controller coupled to the propulsion system and the one or more sensor systems that, by a processor, is configurable to:

detect a steady state condition based at least in part on the measurement data;

during the steady state condition:

dynamically determine an axle torque reference value based at least in part on the axle torque measurement data during the steady state condition; and dynamically determine a vehicle speed reference value based at least in part on the speed measurement data during the steady state condition; and after the steady state condition:

determine an updated axle torque reference value based at least in part on the axle torque reference value and a stored axle torque reference value from a preceding steady state condition;

determine an updated vehicle speed reference value based at least in part on the vehicle speed reference value and a stored vehicle speed reference value from the preceding steady state condition;

determine estimated values for one or more nominal axle torque coefficients based at least on a relationship between the updated axle torque reference value and the updated vehicle speed reference value;

determine a torque command for operating the vehicle based at least in part on a targeted speed for the vehicle using the estimated values for the one or more nominal axle torque coefficients; and operate the propulsion system in accordance with the torque command.

20. The vehicle of claim 19, wherein the controller is configurable to determine the estimated values by recursively estimating the one or more nominal axle torque coefficients based at least on the relationship between the updated axle torque reference value and the updated vehicle speed reference value and one or more additional pairs of respective axle torque reference values and respective speed reference values.

* * * * *